H. L. De ZENG.
LAMP-TRIMMER.
No. 169,785.
Patented Nov. 9, 1875.
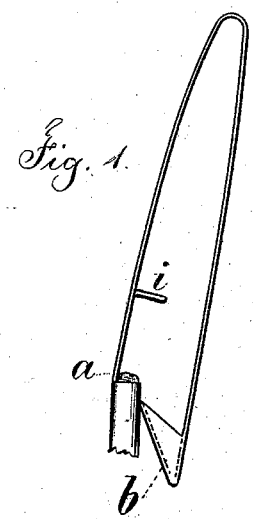
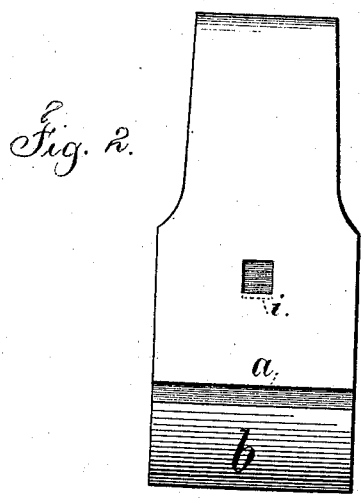
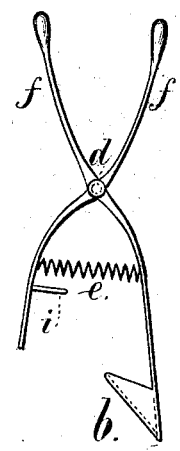

UNITED STATES PATENT OFFICE.

HENRY L. DE ZENG, OF GENEVA, NEW YORK.

IMPROVEMENT IN LAMP-TRIMMERS.

Specification forming part of Letters Patent No. 169,785, dated November 9, 1875; application filed April 29, 1875.

*To all whom it may concern:*

Be it known that I, HENRY L. DE ZENG, of Geneva, in the county of Ontario and State of New York, have invented an Improvement in Lamp-Trimmers, of which the following is a specification:

The object of this invention is to remove the carbonaceous crust from the wicks of lamps with uniformity and rapidity.

I make use of a scraper on one arm of a handle combined with a receptacle connected at the other arm of the handle, so that when the flat wick-tube is grasped between the scraper and receptacle, and the scraper is drawn upward while held at an inclination and pressed against the wick-tube, the end of the scraper, as soon as it clears the upper end of the wick-tube, suddenly is moved across the same toward the receptacle, carrying the carbon with it, and separating the crust from the wick and tube, and delivering it into the receptacle, so that the wick is left smooth and ever ready for lighting. This device is distinguished from the cutting scissors or snuffers that have heretofore been used, because in my trimmer the wick and tube are simply scraped transversely.

In the drawing, Figure 1 is an edge view of the instrument as in use. Fig. 2 is a side view of the same, and Fig. 3 is an edge view of the implement with a joint and handles.

The scraping-edge $a$ is straight, and either of metal or of a piece of stiff leather or similar material connected to the metal; and $b$ is the receptacle for the carbonaceous crust from the wick and tube. The receptacle $b$ and scraping-edge $a$ are preferably connected by a bent strip of spring metal as forming the arms of the grasping device or handle seen in Fig. 1; but the joint $d$ may be used, as seen in Fig. 3, with a spring, $e$, to open the instrument, and handles $f$ may be extended from the respective arms at the opposite sides of the joint to the scraper and receptacle. The trimmer is to be applied to the wick-tube in a slightly-inclined position, as seen in Fig. 1, and pressure given by the thumb and finger, so as to grasp the wick-tube, and then the trimmer is moved upwardly until the end of the scraper clears the wick-tube, when the scraper will move rapidly across the wick-tube and wick transversely, carrying with it the carbonaceous matter, and depositing it in the receptacle $b$. The stop $i$ upon the inner surface of the scraper-arm snapping suddenly against the opposite arm causes the scraper to free itself from the carbon that might otherwise adhere to such scraper.

By this trimming device the wicks of lamps can be rapidly freed from the carbonaceous crust, so as to be ready for lighting.

The arms may be rigid, and the scraping effected by swinging the instrument across the top of the wick.

I claim as my invention—

The lamp-trimmer made with the scraping-edge $a$ opposite to the receptacle $b$, and nearly parallel with the same, the scraper and receptacle being connected by arms that extend above the wick when in use, substantially as set forth.

Signed by me this 26th day of April, A. D. 1875.

HENRY L. DE ZENG.

Witnesses:
G. W. NICHOLAS,
MATTHEW WILSON.